UNITED STATES PATENT OFFICE.

OTTO LIEBKNECHT, OF FRANKFORT-ON-THE-MAIN, GERMANY, ASSIGNOR TO DEUTSCHE GOLD- & SILBER-SCHEIDEANSTALT VORM. ROESSLER, OF FRANKFORT-ON-THE-MAIN, GERMANY.

MANUFACTURE OF SODIUM ARYLAMINS.

No. 903,588.     Specification of Letters Patent.     Patented Nov. 10, 1908.

Application filed June 3, 1908. Serial No. 436,421.

*To all whom it may concern:*

Be it known that I, OTTO LIEBKNECHT, a subject of the Emperor of Germany, and a resident of Frankfort - on - the - Main, Germany, have invented certain new and useful Improvements in the Manufacture of Sodium Arylamins, of which the following is a specification.

Sodium has no perceptible action on anilin, even if both bodies be kept in contact with each other for several days and be energetically stirred, at the boiling point of anilin. Sodium behaves in the same manner towards other arylamins, such, for instance, as mono-methyl-anilin, toluidin, and the like.

The preparation of sodium arylamins by the direct action of sodium on anilin has therefore not hitherto been practicable.

I have discovered that sodium will combine smoothly with the aforesaid aromatic bodies and hydrogen be evolved, if the reaction be effected in the presence of a small amount of a catalytic substance such for instance as copper, a copper oxid, a copper salt, or nickel, or cobalt, or an oxid, or a salt, of nickel, or of cobalt, or other heavy metal, or an oxid or a salt thereof.

The combination can be effected at a comparatively low temperature; as sodium reacts violently on anilin at a temperature as low as 140° centigrade, if a catalytic substance be used.

The following are examples, of how the invention may be performed but it is not limited to these examples. The parts are by weight.

Example I. 300 parts of anilin are heated to 140° centigrade and about from 0.1 to 0.2 of a part of nickel oxid is added and then 45 parts of sodium are added in several portions, at a time care being taken to await the end of the reaction of a preceding portion before adding a further portion of sodium. Hydrogen is evolved and sodium-anilin is formed. The sodium-anilin can be separated in the usual manner from the excess of anilin.

Example II. 400 parts of ortho-toluidin are heated to about 175° centigrade, about 0.2 of a part of copper carbonate is added, and then, while stirring, 30 parts of sodium are added in portions at a time as stated in Example I. Hydrogen is evolved and ortho-toluidin-sodium is formed, and can be separated in the usual manner from the excess of ortho-toluidin.

Example III. 400 parts of paratoluidin are heated to about 175 to 180° centigrade, about 0.3 of a part of copper-carbonate is added and then while stirring 30 parts of sodium are added in portions at a time as stated in Example I. Hydrogen is evolved and paratoluidin-sodium is formed and can be separated in the usual manner from the excess of paratoluidin.

Example IV. 400 parts of asymmetric meta-xylidin are heated to about 200° centigrade, about 0.5 of a part of copper-carbonate is added and then while stirring 40 parts of sodium are added in portions. Hydrogen is evolved and asymmetric meta-xylidin-sodium is formed and can be separated in the usual manner from the excess of asymmetric meta-xylidin.

Eample V. 200 parts of mono-methylanilin are heated to boiling point with 0.2 of a part of cobalt oxid and 20 parts sodium are added thereto in portions at a time as stated in Example I. Hydrogen is evolved and the sodium aryl compound is formed, and can be separated in the usual manner from the excess of mono-methyl-amin. The reaction in this example proceeds more slowly than in the preceding examples.

I claim:—

1. The herein described process of manufacturing sodium-aryl-amins by causing sodium to act on a heated aryl-amin in the presence of a catalytic substance as and for the purpose set forth.

2. The herein described process of manufacturing a sodium arylamin by causing sodium to act on heated anilin in the presence of a catalytic substance as and for the purpose set forth.

In testimony whereof I have signed my name to this specification in the presence of two subscribing witnesses.

OTTO LIEBKNECHT.

Witnesses:
    JEAN GRUND,
    CARL GRUND.